(12) United States Patent
Domb et al.

(10) Patent No.: US 7,342,811 B2
(45) Date of Patent: Mar. 11, 2008

(54) LOSSLESS CLAMP CIRCUIT FOR DC-DC CONVERTERS

(75) Inventors: Moshe Domb, Irvine, CA (US); Amritlal H. Patel, Anaheim, CA (US); Jackie Tang, Irvine, CA (US)

(73) Assignee: Cherokee International Corporation, Tustin, CA (US)

( * ) Notice: Subject to any disclaimer, the term of this patent is extended or adjusted under 35 U.S.C. 154(b) by 352 days.

(21) Appl. No.: 11/140,315

(22) Filed: May 27, 2005

(65) Prior Publication Data

US 2006/0268585 A1 Nov. 30, 2006

(51) Int. Cl.
*H02M 3/335* (2006.01)
*H02H 7/122* (2006.01)

(52) U.S. Cl. ................... 363/21.06; 363/56.01

(58) Field of Classification Search ............... 363/16, 363/17, 20, 21.01, 21.06, 21.14, 56.01, 56.02, 363/95, 97, 131, 132, 21.02
See application file for complete search history.

(56) References Cited

U.S. PATENT DOCUMENTS

| | | | |
|---|---|---|---|
| 5,825,638 A | | 10/1998 | Shutts |
| 5,872,705 A | * | 2/1999 | Loftus et al. ............ 363/21.06 |
| 6,091,616 A | * | 7/2000 | Jacobs et al. ............... 363/127 |
| 6,128,206 A | | 10/2000 | Sun et al. |
| 6,175,219 B1 | | 1/2001 | Imamura et al. |
| 6,181,579 B1 | | 1/2001 | Nagai et al. |
| 6,343,023 B1 | | 1/2002 | Wunderlich |
| 6,563,719 B1 | * | 5/2003 | Hua et al. ................ 363/21.06 |
| 6,583,993 B2 | | 6/2003 | Hua |
| 6,704,211 B1 | | 3/2004 | Vogman |
| 6,771,521 B1 | * | 8/2004 | Xiong et al. ................ 363/53 |
| 6,798,670 B2 | | 9/2004 | King |
| 7,196,913 B2 | * | 3/2007 | Tsuruya et al. ......... 363/21.06 |
| 2001/0005322 A1 | | 6/2001 | Uchida |

* cited by examiner

*Primary Examiner*—Matthew V. Nguyen
(74) *Attorney, Agent, or Firm*—Harold L. Jackson

(57) ABSTRACT

A lossless clamping circuit for use in a synchronous rectifier DC-DC converter in which at least one transistor switch (MOSFET) periodically connects two terminals of an output transformer winding across a main output and return terminal to provide a DC current at a selected voltage for a load connected between the output and reference terminals. A diode and an auxiliary capacitor are connected in series across the MOSFET's drain source so that the capacitor accumulates a charge in accordance with the reverse recovery current in the winding leakage inductance when the MOSFET is turned off and an auxiliary DC-DC converter is connected to the auxiliary capacitor for converting the accumulated charge across the capacitor to a DC current at a selected output voltage. Preferably the output of the auxiliary DC-DC converter is connected to the main output terminal to supplement the output power.

13 Claims, 8 Drawing Sheets

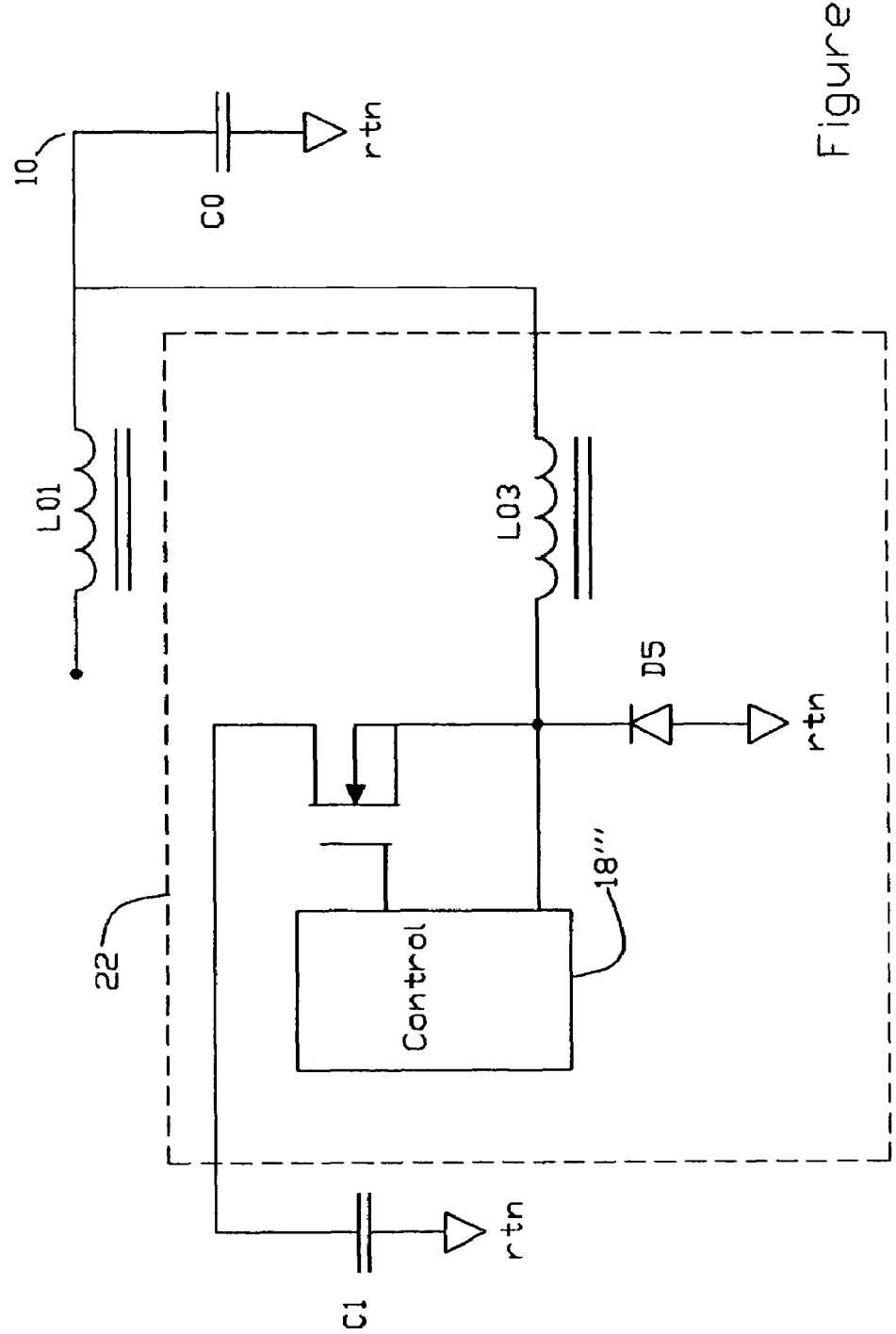

LOSSLESS CLAMP CIRCUIT FOR DC-DC CONVERTERS

FIELD OF THE INVENTION

The present invention relates to DC-DC and AC-DC converters and more particularly to such converters employing synchronous rectification.

BACKGROUND OF THE INVENTION

FIGS. 1 and 2 illustrate prior art DC-DC converters. In FIG. 1 the common terminal of split transformer secondary (output) windings N1 and N2 is connected to a return voltage such as ground while the other terminals are connected to an output terminal 10 through diodes D1 and output inductor or choke L out as shown. An output capacitor is connected between the output terminal and ground so that rectified DC current is provided at 10. The circuit of FIG. 2 is a replica of FIG. 1 except the diodes D1 have been replaced with metal oxide semiconductor field effect transistors (MOSFETS) which are synchronously controlled by controller 18.

The efficiency of all DC-DC converters is dependant upon the voltage drop of the output rectifier(s), e.g., D1 in FIG. 1. As the power density increases(MOSFETS) Q1 and Q2 (FIG. 2) are used instead of the diodes. The MOSFETS' gates are driven in synchronism with a pulse width modulation (PWM) controller 11.

The problem with synchronous rectification for output voltages of 12v or larger is the reverse recovery of the MOSFET's internal body diode in conjunction with the output winding's series leakage inductance. When the MOSFET turns off the current in the series inductance, labeled Ids in FIG. 3a, continues to flow in the body diode and then resonates to a peak negative current—IRR (FIG. 3b). After the reverse recovery period (TR), the negative current in Ls causes a large positive spike across the MOSFET's drain source (Vds). A conventional snubber network R-C (FIG. 3a) dampens this voltage spike at the cost of heavy losses which make the 12v or higher synchronous rectification not practical.

U.S. Pat. No. 6,128,206 ("'206 patent") to Sun et al discloses a DC-DC synchronous rectifier power converter in which energy resulting for parasitic inductance when the transistor switches (MOSFETS) are turned off is utilized to drive the gate terminals of the switches. While the '206 circuitry may save some energy at low power requirements at high power requirements the additional current supplied to the MOSFETS' gate terminals is wasted.

There is a need to improve the efficiency of synchronous rectifier DC-DC converters at all power settings.

SUMMARY OF THE INVENTION

A conventional DC-DC convertor, employing synchronous rectification, includes an output (secondary) winding with a main DC output terminal connected to one terminal of the winding through an output inductor with an output capacitor connected between the output terminal and a return voltage such as ground. A transistor switch (MOSFET) has its drain source terminals connected between the return and another terminal of the winding to provide synchronously rectified current to the output terminal. FIG. 4 is a typical example.

A lossless clamp or power recovery circuit for use in such a DC-DC converter, in accordance with the present invention, includes a rectifier and an auxiliary capacitor connected in series across the drain source of the transistor switch so that the auxiliary capacitor accumulates a charge in accordance with the reverse recovery current in the winding leakage inductance when the transistor switch ceases to conduct. An auxiliary DC-DC converter is connected across the auxiliary capacitor to convert the charge across the auxiliary capacitor to a DC current at the main output terminal or at a housekeeping bias supply.

Preferably the auxiliary output terminal is connected to the main output terminal so that the power recovered by the auxiliary capacitor supplements the output power of the converter. In the alternative the power available at auxiliary output terminal may be used as a source of housekeeping bias supply for other components, drive a cooling fan, etc.

The construction and operation of the present invention may best be understood by reference to the following description taken in conjunction with the appended drawings in which like components are given the same reference designation in the several figures.

BRIEF DESCRIPTION OF THE DRAWINGS

FIG. 9 is a circuit diagram of a synchronous rectifier DC-DC converter with a DC input voltage.

DESCRIPTION OF THE PREFERRED EMBODIMENT

Figure 4:
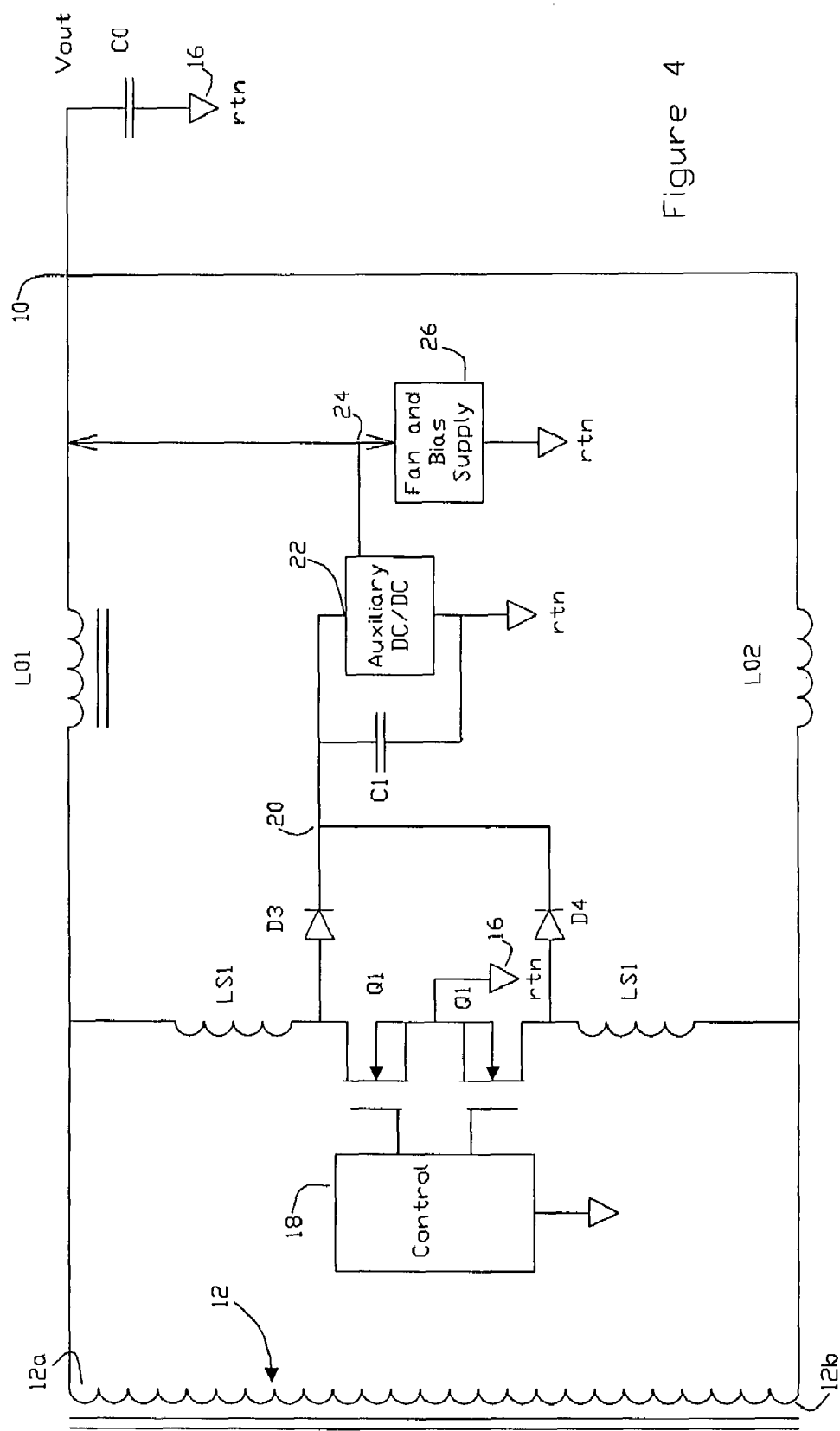
FIG. 4 is a circuit diagram of a lossless clamp or a power recovery circuit incorporated in a synchronous rectifier DC-DC converter in accordance with the present invention.

Referring now to FIG. 4 a main DC output terminal 10 is connected to a first terminal 12a of an output (i.e., secondary) winding 12 through an output indicator L01 and through another output inductor L02 to a second terminal 12b as shown. An output capacitor C0 is connected between terminal 10 and a return terminal 16, e.g., ground, to provide a DC voltage thereacross to supply a load (not shown).

The drain source terminals of the transistor switches (i.e., MOSFETS) Q1 and Q2 are connected between terminals 12a and 12b and the return terminal 16, respectively as shown. Inductance elements Ls1 and Ls2 represent the leakage inductance of the output winding. The gate terminal of the MOSFETS Q1 and Q2 are controlled by the pulse width modulation (PWM) 18 to provide synchronously rectified DC current at a desired voltage, e.g., 12v, at the main output terminal in a conventional manner. The arrows indicate the direction of current flow when the respective MOSFETS are turned on.

A pair of diodes D3 and D4 are connected between the drain terminals of the MOSFETS Q1 and Q2 and one terminal 20 of a charge accumulating capacitor C1, as shown. The other terminal of C1 is connected to the return terminal 16. Capacitor C1 accumulates a charge in accordance with the reverse recovery current in the winding leakage inductance (represented by Ls1 and Ls2) when the respective MOSFET is turned off. An auxiliary DC-DC converter 22, connected between C1's terminal 20 and an auxiliary output terminal 24, converts the charge accumulated across C1 to a direct current at a selected voltage.

The auxiliary output terminal 24 may be connected to a fan/bias supply circuit 26 to provide bias supply for other components drive a cooling fan, but is preferably connected to the main output terminal 10 to supplement the output current. The power consumed by the load or bias supply or fan depletes the charge across C1 preparing it for the next switching cycle.

Figure 2:
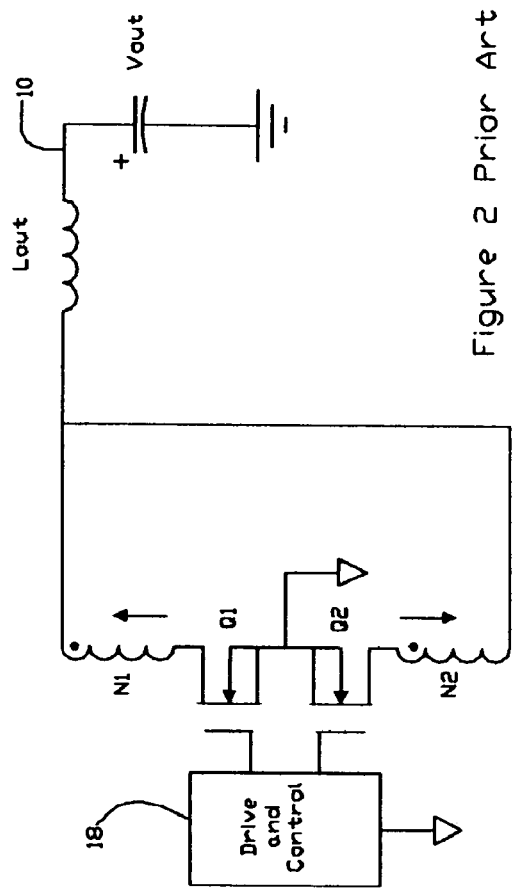
FIGS. 1 and 2 are simplified schematic circuit diagrams of prior art DC-DC convertors employing output diodes and synchronously controlled MOSFETS, respectfully.
Figure 1:
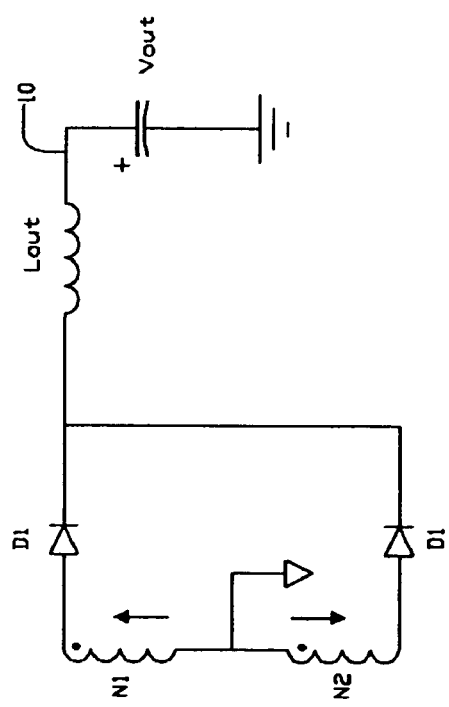
Figure 3B:
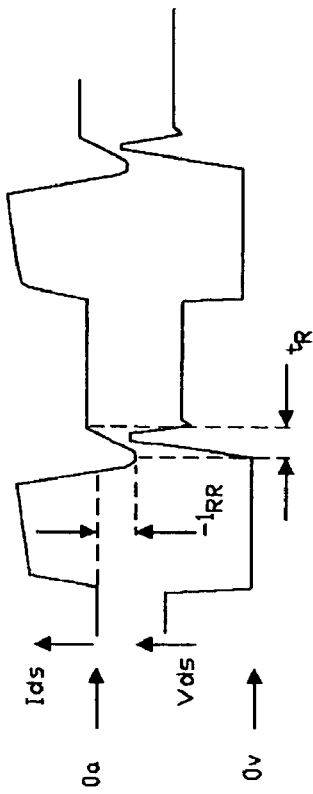
FIG. 3B is a waveform diagram showing the MOSFET's drain source current (Ids) and voltage (Vds) waveforms, the reverse recovery current (IRR) and resulting voltage spike across the drain source during turn off of the MOSFET.
Figure 3A:
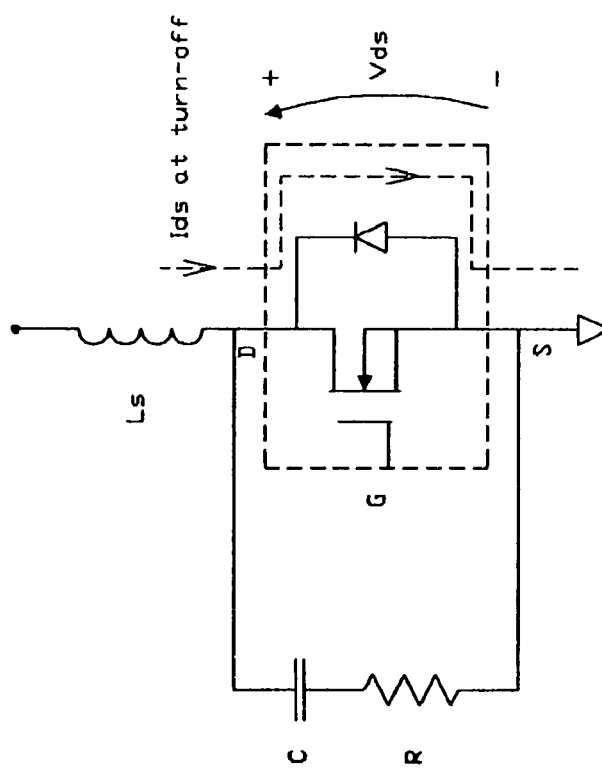
FIG. 3A is a simplified schematic circuit diagram (with a conventional R-C snubber network) showing the path of the leakage inductance reverse recovery current through the drain source of a MOSFET with the resultant reverse voltage spike across the drain source terminals.

In this manner the voltage at terminal 20 is clamped at a selected voltage which is considerably lower than that compared to the drain source voltage when a conventional RC snubber network such as that shown in FIG. 3a is used. This enables the use of lower voltage MOSFETS and results in boosting the efficiency through the use of lower RDson FETS.

Figure 5:
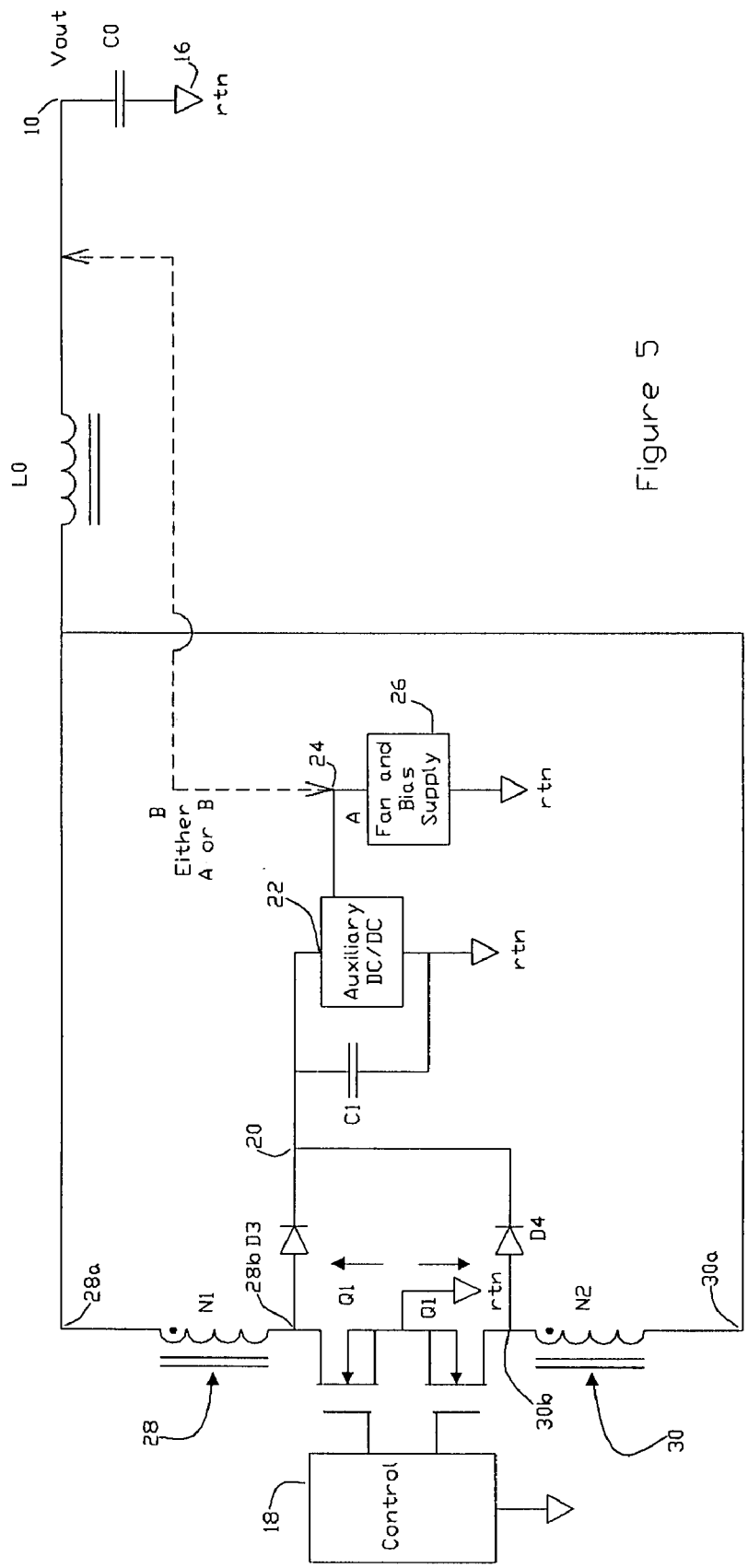
FIG. 5 is a circuit diagram of a lossless clamp circuit in the push pull output stage of a synchronous rectifier DC-DC converter.

FIG. 5 illustrates a modified synchronous rectifier DC-DC converter in which transistor switches Q1 and Q2 are connected to a center tape output windings 28, 30 via a push-pull topology to provide current to the main output terminal during each half wave of the input voltage. The source and drain terminals of Q1 and Q2 are connected to the return and terminals 28b and 30b of the split output windings, respectfully, a shown. The other terminals 28a and 30a are connected in series with the output inductor L0 to the main output terminal. When Q1 and Q2 are turned on current flows through windings 28 and 30 respectively to provide a positive DC voltage at terminal 10. The power recovery circuit D3, D4 and C1 and auxiliary DC-DC converter operates as explained in connection with FIG. 4. The power recovered from C1 is preferably utilized to supplement the output power, i.e., option B in the figure.

Figure 6:
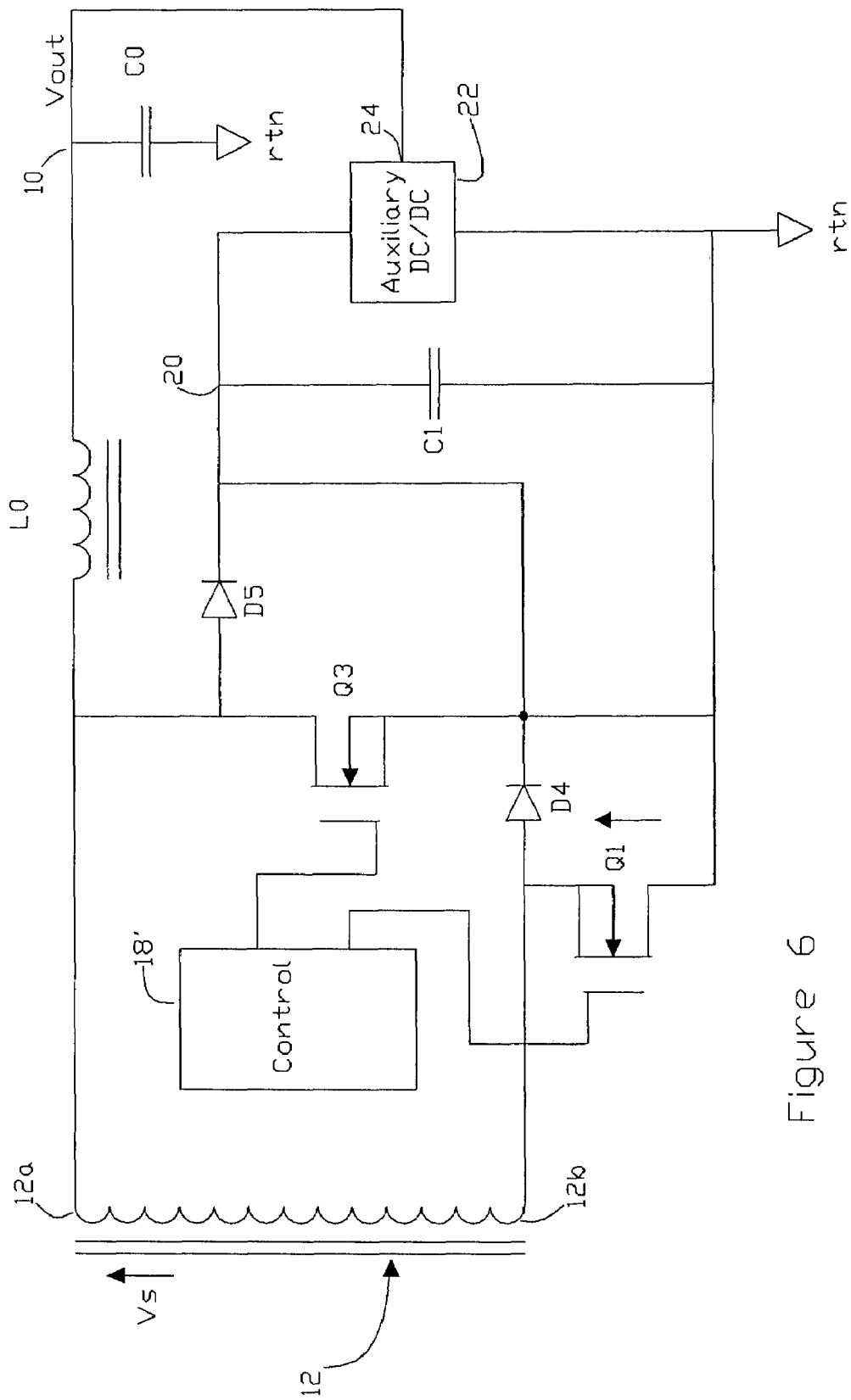
FIG. 6 is a circuit diagram of a lossless clamp circuit in the forward stage of a synchronous rectifier DC-DC converter.

FIG. 6 illustrates a forward synchronous rectifier DC-DC converter with the transformer winding conducting when Q1 is on to provide a positive voltage to output inductor L0. When Q1 is turned off Q3 is turned on to short the input (terminal 12a) to the output inductor to the return (e.g., ground) so that L0 sees no voltage during the off time of Q1. The output voltage at terminal 10 is the output winding voltage Vs×D where D=the duty cycle, i.e., time of Q1 on÷total cycle time. Control circuit 18" controls Q1 and Q3 in a conventional manner.

Figure 7:
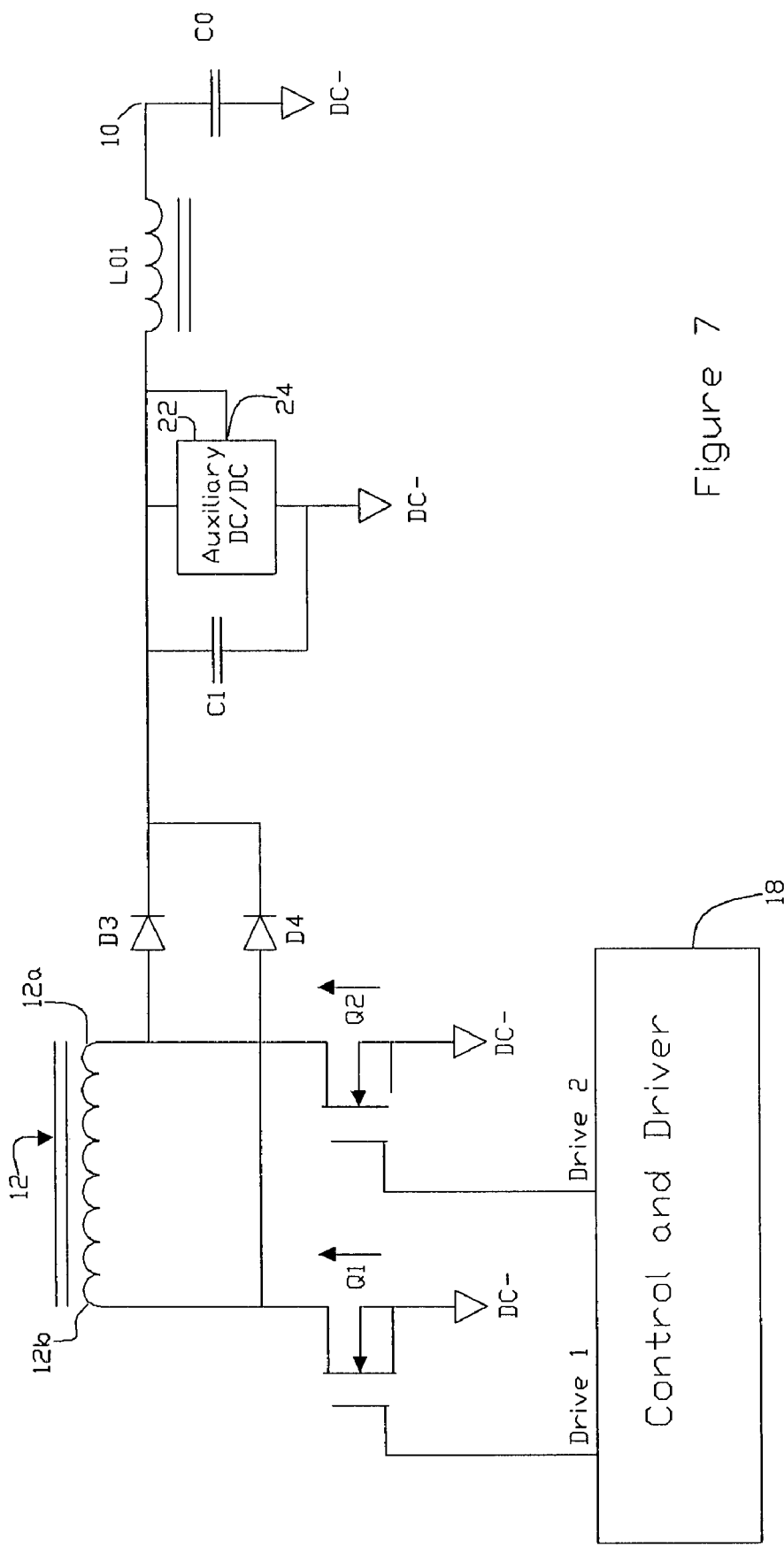
FIG. 7 is a circuit diagram of a lossless clamp circuit in the input push pull stage of a synchronous rectifier DC-DC converter.

FIG. 7 illustrates a synchronous DC-DC converter with the power recovery circuit in the input section of a push-pull stage. The DC-DC converter is similar to that shown in FIG. 4 with the return voltage at a negative potential. The output current from the auxiliary DC-DC converter is shown as being supplied to the output terminal 10 to supplement the output power.

Figure 8:
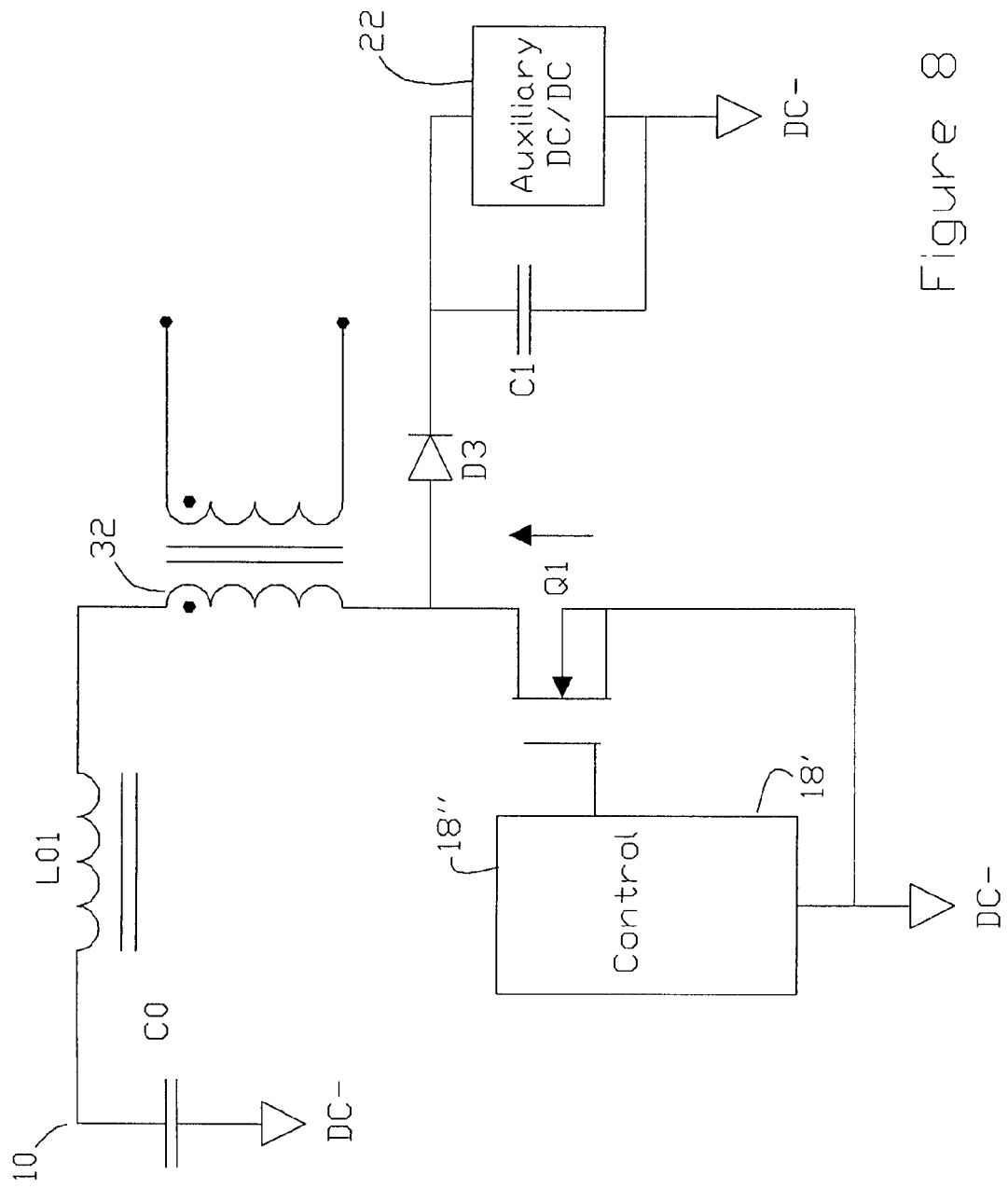
FIG. 8 is a circuit diagram of a lossless clamp circuit in the forward input stage of a half-wave synchronous rectifier DC-DC converter.

FIG. 8 illustrates the use of a lossless clamp or power recovery circuit in the input section stage of a forward DC-DC converter in which output winding 32 applies a positive voltage to output inductor L01 when Q1 is on. The power recovery circuit D3, C1 functions as described previously.

An example of an auxiliary DC-DC is shown in FIG. 9. It consists of a MOSFET switch which has its drain connected to the auxiliary capacitor C1 positive side and the source connected to a secondary output inductor L03. The other side of this secondary output inductor connects to the main output. The control of this auxiliary DC-DC converts the charge across C1 and current going to the output load thus supplementing the output current.

There has thus been described a power recovery circuit or lossless clamp for use in synchronous rectifier DC-DC converters. Modification of the invention will occur to those skilled in the art without involving a departure from the spirit and scope of the invention as defined by the appended claims.

What is claimed is:

1. In a power recovery circuit for use in a DC-DC converter, the converter having an output winding (12), a main DC output terminal connected to one terminal of the winding through an output inductor (L01) and an output capacitor (C0) connected between the main output terminal and a return voltage with a MOSFET transistor switch having its drain and source terminals connected between the return and another terminal of the winding and a controller (18) for supplying the gate source drive current to the MOSFET independently of the output winding (12) to provide a synchronously rectified current to the main output terminal, the power recovery circuit comprising:
   a) a rectifier (D3) and an auxiliary capacitor (C1) connected in series across the transistor's drain source whereby the auxiliary capacitor accumulates a charge of the reverse recovery current in the winding leakage inductance when the transistor switch ceases to conduct; and
   b) an auxiliary DC-DC converter connected between the auxiliary capacitor and an auxiliary output terminal to convert charge across the auxiliary capacitor to a direct current at a selected voltage at the auxiliary output terminal (24).

2. The power recovery circuit of claim 1 wherein the auxiliary output terminal is arranged to supply current to other circuit components.

3. The power recovery circuit of claim 1 wherein the auxiliary output terminal is connected to the main output terminal.

4. The power recovery circuit of claim 3 wherein the converter includes a second output inductor (L02) connected between said other winding terminal and the main output terminal and a second transistor switch having its drain source electrodes connected in series between said one winding terminal and the return voltage and wherein the power recovery circuit further includes a second rectifier (D4), the second rectifier and the auxiliary capacitor being coupled across the drain source electrodes of the second transistor switch to increase the auxiliary capacitor's accumulated charge in accordance with the reverse recovery current in the winding leakage inductance when the second transistor switch ceases to conduct.

5. The power recovery circuit of claim 1 wherein the converter includes a second output winding with the output inductor connected to one terminal of the second winding and a second transistor switch having its drain source electrodes connected in series with the other terminal of the second winding and the return voltage so that the first and second transistor switches provide synchronously rectified current to the output terminal during both halves of the voltage waveform in the output winding and wherein the power recovery circuit includes a second rectifier, the second rectifier and auxiliary capacitor being coupled across the second transistor switch's drain source electrodes to increase the auxiliary capacitor's accumulated charge in accordance with the reverse recovery current in the second winding leakage inductance when the second transistor switch ceases to conduct.

6. In a lossless clamping circuit for use in a synchronous rectifier DC-DC converter in which at least one transistor switch, under the control of a PWM controller, periodically connects at least two terminals of an output transformer winding across a main output and return terminal for current flow through the winding in one direction to provide a DC current at a selected voltage for a load connected between the main output and reference terminals, the PWM controller being independent of the transformer winding, the clamping circuit comprising:
   a) a diode and an auxiliary capacitor connected in a series relationship across the drain source terminals of the transistor switch so that the capacitor accumulates a charge in accordance with the reverse recovery current in the winding leakage inductance when the transistor switch ceases to conduct to clamp the peak voltage across the drain source electrode of the transistor switch at a maximum preselected value; and
   b) an auxiliary DC-DC converter connected to the auxiliary capacitor for converting the accumulated charge on the auxiliary capacitor to a DC current at a selected output voltage.

7. The lossless clamping circuit of claim 6 wherein the converter includes a second transistor switch, under the control of said PWM controller, which periodically connects said two winding terminals across the output and reference terminals for current flow through the winding in the opposition direction and wherein the clamping circuit includes a second diode with the second diode and auxiliary capacitor being connected in a series across the drain source electrodes of the second transistor switch to increase the auxiliary capacitor's accumulated charge in accordance with the reverse recovery current in the winding leakage inductance when the second transistor switch ceases to conduct.

8. The lossless clamping circuit of claim 6 wherein the output transformer includes a second output winding with a second transistor switch, under the control of said PWM controller, periodically connecting the two terminals of the second output winding across the main output and return terminals for current flow in the opposite direction to provide current to the main output terminal during each half wave of the input voltage and wherein the clamping circuit further includes a second diode with the second diode and auxiliary capacitor connected in series across the drain source terminals of the second transistor switch to increase the auxiliary capacitor's accumulated charge in accordance with the reverse recovery current in the second winding's leakage inductance when the second transistor switch ceases to conduct.

9. The lossless clamp of claim 6 wherein the output of the auxiliary DC-DC converter is connected to the main output terminal.

10. The lossless clamp of claim 6 wherein the output of the auxiliary DC-DC converter is arranged to supply current to other components.

11. The lossless clamp of claim 7 wherein the output of the auxiliary DC-DC converter is connected to the main output terminal.

12. The lossless clamp of claim 7 wherein the output of the auxiliary DC-DC converter is arranged to supply current to other components.

13. The lossless clamp of claim 8 wherein the output of the auxiliary DC-DC converter is arranged to supply current to other components.

* * * * *